(12) United States Patent
Kegel et al.

(10) Patent No.: US 12,366,270 B2
(45) Date of Patent: Jul. 22, 2025

(54) METHOD AND DEVICE FOR CALIBRATING A CLUTCH, AND AGRICULTURAL TOWING VEHICLE

(71) Applicant: DEERE & COMPANY, Moline, IL (US)

(72) Inventors: Volker Kegel, Mannheim (DE); David Mueller, Dettenheim (DE); Rainer Gugel, Plankstadt (DE); Norbert Fritz, Ilvesheim (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/672,432

(22) Filed: May 23, 2024

(65) Prior Publication Data

US 2024/0392846 A1    Nov. 28, 2024

(30) Foreign Application Priority Data

May 24, 2023   (DE) .......................... 102023113595.3

(51) Int. Cl.
  *F16D 48/06*    (2006.01)
(52) U.S. Cl.
  CPC ...... *F16D 48/06* (2013.01); *F16D 2500/1026* (2013.01); *F16D 2500/10412* (2013.01); *F16D 2500/111* (2013.01); *F16D 2500/3022* (2013.01); *F16D 2500/30421* (2013.01);
  (Continued)
(58) Field of Classification Search
  CPC ................... F16D 48/06; F16D 48/062; F16D 2500/1026; F16D 2500/10412; F16D 2500/3022; F16D 2500/111; F16D 2500/30426; F16D 2500/30428; F16D 2500/5018; F16D 2500/50245; F16D 2500/50263; F16D 2500/50272; F16H 2061/064; F16H 2342/04
  See application file for complete search history.

(56) References Cited

U.S. PATENT DOCUMENTS

| 10,060,486 B2 | 8/2018 | Omran et al. |
| 2015/0094922 A1 | 4/2015 | Dix et al. |
| (Continued) | | |

FOREIGN PATENT DOCUMENTS

| DE | 102018200835 B4 | 4/2021 |
| EP | 1293697 A2 | 3/2003 |

OTHER PUBLICATIONS

Extended European Search Report and Written Opinion issued in European Patent Application No. 24173723.8 dated Oct. 22, 2024, in 14 pages.

*Primary Examiner* — Timothy Hannon

(57) ABSTRACT

A method for calibrating a selected clutch arranged within a drivetrain of an agricultural towing vehicle. The selected clutch is activatable between a closed and an open state. The method includes connecting the selected clutch in terms of drive on the drive side to a running drive motor of the agricultural towing vehicle and connecting in terms of drive on the output side to an output shaft, defining the value of a first physical variable bringing about the clutch activation, determining a second physical variable representing the rotation of the output shaft, and assigning the second physical variable representing the rotation of the output shaft to the value of the first physical variable bringing about the clutch activation, in order to generate calibration data of the selected clutch depending on the assignment.

18 Claims, 3 Drawing Sheets

(52) U.S. Cl.
CPC .............. *F16D 2500/30426* (2013.01); *F16D 2500/30428* (2013.01); *F16D 2500/5018* (2013.01)

(56) References Cited

U.S. PATENT DOCUMENTS

| | | |
|---|---|---|
| 2017/0198656 A1 | 7/2017 | Omran et al. |
| 2018/0187728 A1 | 7/2018 | Vora et al. |

METHOD AND DEVICE FOR CALIBRATING A CLUTCH, AND AGRICULTURAL TOWING VEHICLE

CROSS-REFERENCE TO RELATED APPLICATIONS

This application claims priority to German Patent Application No. 102023113595.3, filed May 24, 2023, which is hereby incorporated by reference.

FIELD OF THE DISCLOSURE

The disclosure relates to a method and device for calibrating a clutch in a drivetrain of an agricultural towing vehicle.

BACKGROUND

There are various systems and methods for controlling a torque transmitting clutch. Control systems can use sensed rotational speed to determine operating conditions of a clutch. Control systems can disengage the clutch when predetermined values of slip are exceeded.

SUMMARY

EP 1 293 697 A2 discloses a method and a device for controlling a hydraulically operated clutch, in particular a PTO clutch, within a drivetrain of an agricultural machine. The clutch is activated by an electromagnetically actuated proportional valve. Sensors are used to determine a rotational speed upstream and downstream of the clutch, with a clutch slip being determined therefrom. By means of a controlled time change of the value, corresponding to the clutch pressure, of a valve flow of the proportional valve, the clutch slip is continuously adjusted and maintained at a constant value. It is assumed in this connection that, at a constant or set slip value, there is a fixed relationship between an output torque acting on the PTO and the valve flow, which can be determined by tests or theoretical calculations. With the aid of said fixed relationship, the output torque is determined from the present slip value and the valve flow. A prerequisite for the torque determination is therefore the provision of the above-mentioned fixed relationship in the sense of calibration data with regard to a clutch.

Starting from this reference point, it is the object of the present disclosure to propose a method, a device, and an agricultural towing vehicle, which permit precise calibration within a drivetrain of the towing vehicle in a technically simple manner.

This object is achieved by a method, device, and an agricultural towing vehicle having the features of any independent claim. The dependent claims can relate to more advantageous embodiments of the disclosure.

According to the disclosure, a method for calibrating a clutch arranged and selected within a drivetrain of an agricultural utility vehicle is proposed. The utility vehicle is for example a tractor. The clutch selected in each case is activatable between a closed state (with complete power transmission) and an open state (with interrupted power transmission). During the calibration, the selected clutch is connected in terms of drive on the drive side to a running drive motor of the towing vehicle. On the output side, the clutch is connected in terms of drive to an output shaft. The clutch is activated and the value of a physical variable (e.g. electrical valve flow of a hydraulic valve activating the clutch) bringing about the clutch activation is defined or set. In parallel, in particular at the same time, a physical variable representing the rotation of the output shaft (e.g. rotational speed, angular speed, angular acceleration) is determined. Depending on said rotational variable of the output shaft—and in particular additionally taking into consideration other physical variables, such as a known moment of inertia of said output shaft—a torque of the selected clutch can be determined in physical terms. The rotational variable of the output shaft is therefore assigned to the value of the physical variable bringing about the clutch activation. Depending on this assignment, clutch-specific calibration data (e.g. table of values, formula (formulae), characteristic curve) can be generated.

In some embodiments, the calibration data of the selected clutch can be generated with little technical effort and can therefore be provided cost-effectively for different technical applications. For the generation, in particular determination and/or calculation, of the calibration data, the basic technical effort remains low with high data accuracy at the same time, since only the value of a physical variable bringing about the clutch activation (e.g. electrical control current of a hydraulic valve activating the clutch) is defined or technically set, and a physical variable (e.g. angular acceleration) representing the rotation of the output shaft is determined in this defined or set state. An assignment of the value of the clutch activation variable and the rotation variable of the output shaft to each other may be mathematically combined with other known values of characteristic physical variables (e.g. a moment of inertia of the output shaft) in order, derived from this, to generate calibration data for said clutch.

In particular, the calibration data contain a torque characteristic of the selected clutch on the basis of the mutually assigned specific physical variables and values. In one technical application, the calibration data can therefore be provided, at certain positions of the drivetrain of an agricultural towing vehicle, to determine the torques acting there. This allows technically simple and cost-effective drive management (e.g. traction aid) for the towing vehicle to be assisted by the application of the calibration data.

The method can be carried out in particular for any clutch within the drivetrain of the towing vehicle. This enables technical applications of the generated calibration data to be carried out even more flexibly. For example, a precise determination of torques within the drivetrain of an agricultural towing vehicle can be assisted by means of a plurality of clutches and/or different clutches.

In an embodiment, the method is carried out successively for differently defined or set values of the physical variable bringing about the clutch activation. In this way, a complete and precise clutch-specific characteristic curve can be generated as calibration data.

In an embodiment, the clutch is activated by a hydraulic valve and a corresponding hydraulic fluid (e.g. oil). The valve is designed in particular as a proportional valve. This proven clutch activation technology assists in carrying out the method precisely and provides technically simple possibilities of using a suitable physical variable bringing about the clutch activation and of defining or adjusting the values thereof during the method. For this purpose, an electrical control current activating the valve or a hydraulic output pressure of the valve is particularly appropriate. The values of said physical variables can be defined or set without any additional technical effort as the method is being carried out, since said values are also varied for other technical purposes during the operation of the towing vehicle, in particular by a suitable control unit in the towing vehicle.

As already mentioned, a physical variable representing the rotation of the output shaft is determined while the method is being carried out. This variable is for example a rotational speed of the output shaft or an angular speed of the output shaft or an angular acceleration of the output shaft. The values of said variables can be advantageously determined without any additional technical effort using a rotational speed sensor already present in the drivetrain.

In the case of an angular acceleration as the determined rotational variable of the output shaft, the temporal course of said angular acceleration is constructed in particular in such a way that it has an acceleration phase brought about by the activation of the selected clutch. Furthermore, the temporal course of said angular acceleration has a deceleration phase (negative acceleration), which is brought about at least along a time section by the activation of a clutch unit following downstream in the power flow of the drivetrain. With the temporal acceleration and deceleration sequences of the angular acceleration determined in this way, physical properties of the drivetrain, in particular drag moments of the clutches and/or friction torques and/or bearing friction of the drive shaft, can be taken into account when generating the calibration data. This assists the physical accuracy of the calibration data.

In a further embodiment of the disclosure, a moment of inertia of the output shaft is taken into account by said moment of inertia or its value being integrated in the clutch-specific calibration data. In particular, the moment of inertia of the output shaft is already known or can be determined as known by calculations. The consideration of the moment of inertia in the calibration data facilitates the technical application thereof for torque determinations, since a torque can for example be derived from a mathematical product of a moment of inertia and a rotational variable (in particular angular acceleration).

In an embodiment, the value of at least one physical correction variable is contained in the calibration data. In other words, the calibration data to be generated for one or more correction variables or their correction values are supplemented. Taking the correction variable(s) into account assists the generation of technically precise calibration data for the respectively selected clutch. In particular, the at least one physical correction variable comprises the drag torque of the selected clutch and/or the friction torque and/or the bearing friction of a clutch unit mounted downstream of the output shafts in the power flow of the drivetrain.

For example, the selected clutch and one or more clutch units mounted downstream of the output shaft in the power flow are activated in a specific way and in a temporally successive sequence for specific periods of time as the method is being carried out, in order to realize suitable acceleration and deceleration sequences at the output shaft and to acquire the relevant physical variable values arising during these temporal sequences, e.g. the rotational speeds or the values of an angular acceleration of the output shaft. By this means, the above-mentioned at least one physical correction variable or the values thereof can be determined efficiently in terms of the method and taken into account in the calibration data.

In particular, at least one of the following method steps is carried out during the acceleration and deceleration sequences:

the output shaft is separated from all drive connections mounted upstream and downstream in the power flow of the drivetrain;

the output shaft is accelerated by being connected in terms of drive to the drive motor and being separated from the drive connections mounted downstream in the power flow of the drivetrain;

the output shaft which is connected in terms of drive to the drive motor rotates at a rotational speed, in particular constant rotational speed;

the rotating output shaft is decelerated by activating a clutch unit following downstream in the power flow of the drivetrain with a defined value of a physical variable bringing about the clutch activation thereof, wherein an output-side torque of said clutch unit is equal to zero.

An additional development makes provision that, during a deceleration of the rotating output shaft, the selected clutch is in its open state. This ensures that specific physical deceleration properties, in particular of the output shaft, are taken into account with a high degree of accuracy in the calibration data.

In another embodiment, a parking lock and/or a braking device of the towing vehicle is activated at least during the method step of a deceleration of the output shaft. In a technically simple manner, this permits blocking, and therefore method states where torques equal zero, in certain sections of the drivetrain during the calibration. For example, this method state can be used in a rotating output shaft, the rotation of which is intended to be decelerated by a clutch unit following downstream in the power flow, by said clutch unit being activated (e.g. via a hydraulic valve) and at the same time having an output-side torque equal to zero.

In an embodiment of the disclosure, the motor rotational speed of the drive motor of the towing vehicle is kept constant at least temporarily, in particular during the entire method time, while the method is being carried out, in order to generate clutch-specific calibration data of a selected clutch. This ensures consistent physical conditions while the method is being carried out and facilitates the generation of technically accurate calibration data.

The disclosure further relates to a device for calibrating a selected clutch which is arranged within a drivetrain of an agricultural towing vehicle and is activatable between a closed and an open state. The device comprises a control unit for carrying out the method as claimed in any one of the method claims. In particular, the control unit activates the selected clutch between a closed and an open state. Different states of the clutch are achieved in particular by the fact that the control unit changes or varies the value of a physical variable bringing about the clutch activation. The selected clutch is connected in terms of drive on the drive side to a running drive motor of the towing vehicle and is connected in terms of drive on the output side to an output shaft. While the method is being carried out, the control unit defines the value of a physical variable bringing about the clutch activation, or adjusts said value, e.g. the electrical control current of a hydraulic valve that activates the clutch. In parallel, in particular at the same time, the control unit determines a physical variable representing the rotation of the output shaft (e.g. angular speed). The control unit assigns the defined or set value of the activation variable and the rotation variable or the values thereof to one another. This assignment can be undertaken, for example, for different defined or set values of the activation variable according to a table of values. On the basis of the assignment and possibly the values of other characteristic physical variables (e.g. a moment of inertia of the output shaft), calibration data (e.g. table of values, formula (formulae), characteristic curve) can be generated by the control unit for the selected clutch. In particular, the calibration data contain a torque characteristic of the selected clutch on the basis of the mutually assigned specific physical variables. During the operation of the towing vehicle, various torques acting in the drivetrain can therefore be determined with little technical effort using the calibration data. With torques which can be determined in such a manner, the device can assist technically simple and cost-effective drive management (e.g. traction aid) for the towing vehicle.

The device and its control unit can in particular generate clutch-specific calibration data for any clutch within the drivetrain of the agricultural towing vehicle. This allows technical applications of the generated calibration data to be carried out even more flexibly, for example the determination of torques within the drivetrain by means of a plurality of and/or different clutches.

The control unit may be configured as an electronic module, as an embedded system, as a processing unit, as a computer, or as a module for the open-loop and/or closed-loop control of individual components of the device. The control unit may comprise a processor, a memory and/or all of the software, hardware, algorithms, connectors, and in particular also sensors, that are required for the open-loop and/or closed-loop control of the device or components thereof. Individual or all of the method steps of the disclosed method may be configured as a program or algorithm that can be executed on and/or by the control unit. The control unit may comprise any device that can analyze data from various sensors, compare data, and make the decisions necessary to control, in open-loop and/or closed-loop fashion, and/or perform, the operation of the device and the required tasks for the open-loop and/or closed-loop control of the operation of the device.

The control unit may be connected to the device, in particular to the components (e.g. sensors, hydraulic valves) of the device, for example signal-connected and/or connected in a signal-transmitting and/or data-conducting manner. The control unit can be used for the open-loop and/or closed-loop control and/or activation of the interconnected components. A connection in signal-connected fashion and/or signal-transmitting fashion and/or data-conducting fashion should be understood here as meaning that signals are exchanged between the connected components. The connection can be implemented so as to be wired, i.e. in particular with cables, and/or wireless, i.e. by radio, for example using Bluetooth. The communications bus may for example be Isobus, CAN bus, or similar. The control unit may be assigned to the device for carrying out the method and/or to the agricultural towing vehicle, in particular may be arranged on the towing vehicle. The control unit may also be configured in two parts, for example as part of the agricultural towing vehicle and as part of the device. The control unit may be connected directly to the input and output unit which is arranged in a cab of the towing vehicle and by means of which data entered by an operator or the vehicle driver can be transmitted to the control unit or received from and output by the latter. It is however also conceivable for the control unit to be connected indirectly to the input and output unit by a superordinate control unit.

In an embodiment of the disclosure, the device comprises a hydraulic valve for activating a selected clutch of the drivetrain. By means of the control unit, the hydraulic valve is actuable and/or adjustable such that the clutch is activatable between a closed and an open state. In particular, the control unit defines or sets the values of an electrical control current for the hydraulic valve. Furthermore, the control unit can monitor and/or process the defined or set values. The control unit can also process the values of an output pressure of said hydraulic valve (e.g. by means of a pressure sensor).

In a further embodiment, the device comprises a rotational speed sensor for detecting a rotational speed of an output shaft, which is connected in terms of drive to the selected clutch on the output side thereof. With the aid of the detected rotational speed values, in addition to the rotational speed itself, other physical variables representing the rotation of the output shaft (e.g. an angular speed or angular acceleration) can also be determined in a technically simple manner.

The disclosure further relates to an agricultural towing vehicle, for example a tractor, having a device as claimed in any of the apparatus claims. Owing to the device integrated in the towing vehicle, any clutches within the drivetrain of the towing vehicle can be calibrated with little technical effort. This is undertaken by a control unit of the device for the selected clutch and an output shaft connected in terms of drive to said clutch on the output side assigning the values of specific physical variables to one another. The determined value of a rotation variable (e.g. angular speed) of the output shaft is assigned to the defined or set value of an activation variable (e.g. electrical control current of a hydraulic valve). On the basis of this assignment and possibly the values of other characteristic physical variables (e.g. a moment of inertia of the output shaft), calibration data (e.g. table of values, formula (formulae), characteristic curve) can be generated by the device of the towing vehicle for the selected clutch. In particular, the calibration data contain a torque characteristic of the selected clutch on the basis of the mutually assigned specific physical variables. During the operation of the towing vehicle, various torques acting in the drivetrain can therefore be determined with little technical effort using the clutch-specific calibration data. With torques which can be determined in such a manner, technically simple and cost-effective drive management (e.g. traction aid) for the towing vehicle can be assisted.

In particular, the agricultural towing vehicle can generate clutch-specific calibration data with the device for any clutch within its drivetrain. This allows technical applications of the generated calibration data to be carried out even more flexibly, for example the determination of torques within the drivetrain by means of a plurality of and/or different clutches.

For the generation of calibration data $\beta$ for the method and the device and the towing vehicle for a selected clutch Km·n, in particular the following variables are relevant:

the defined or set control currents I_st_m·n (at the clutch Km·n) and I_st_m+1·n (at the clutch Km+1·n), the rotational speeds n_m, detected by means of the rotational speed sensor, of the output shaft Wm and the angular acceleration $\alpha$, determined therefrom, of the output shaft Wm, the moment of inertia Jm, which is known through calculation, of the output shaft Wm, the set rotational speed n_motor of the drive motor, the transmission ratio Rm·n.

These variables or their values are assigned to one another in order to generate the calibration data $\beta$ depending on this assignment.

For the calibration data $\beta=(\beta 1, \beta 2, \beta 3, \beta 4)$, the following equation applies by definition $$\beta = X \backslash \alpha, \qquad \text{(eq. 1)}$$

where X can be defined as a matrix with four vectors X1, X2, X3, X4. The following equations apply $$X1 = n\_m^2, \qquad (eq. 2)$$

$$X2 = (n\_m - (n\_motor \cdot Rm.n))^2, \qquad (eq. 3)$$

$$X3 = I\_st\_m.n, \qquad (eq. 4)$$

$$X4 = I\_st\_m + 1.n. \qquad (eq. 5)$$

Based on the equations eq. 2 to eq. 5, equation eq. 1 is calculated. This results in the result vector β. In this case:

$$\beta 1 = f1/Jm, \qquad (eq. 6)$$

$$\beta 2 = f2/Jm, \qquad (eq. 7)$$

$$\beta 3 = Mm/Jm, \qquad (eq. 8)$$

$$\beta 4 = Mm + 1/Jm. \qquad (eq. 9)$$

The components β1, β2 can be considered to be physical correction variables.

The component β1 contains a factor f1, which comprises the sum of the drag torque M_sm+1 to the clutches Km+1.1 to Km+1·n and the friction torque M_r, i.e. f1=–(M_sm+1–M_r).

The component β2 contains a factor f2=–M_sm, which comprises the drag torque M_sm to the clutches Km·1 to Km·n.

The torque Mm is obtained from β3·Jm for the clutch Km·n at a control current I_st_m·n defined or set by the control unit 52. The torque Mm+1 results from β4·Jm for the clutch Km+1·n at a control current I_st_m+1·n defined or set by the control unit 52.

The above-mentioned method steps for the calibration of a selected clutch Km·n can be repeated for differently defined values of the control currents I_st_m·n, I_st_m+1·n, such that a torque Mm of the clutch Km·n for different control currents I_st_m·n is contained in the calibration data β, in particular in the component β3. In other words, the calibration data β, in particular the component β3, represent a torque characteristic of the clutch Km·n. This torque characteristic can be provided as a complete characteristic curve by means of the calibration data β, in particular the component β3.

The calibration data βcan be generated for any clutches Km·n within the drivetrain or transmission arrangement.

The above and other features will become apparent from the following detailed description and accompanying drawings.

BRIEF DESCRIPTION OF THE DRAWINGS

The disclosure and further advantages and advantageous developments and refinements of the disclosure, both in terms of the hardware and of the method, will be explained in more detail below by means of exemplary embodiments and with reference to the drawings. Components of equivalent or comparable function are identified by the same reference signs. In the drawings.

DETAILED DESCRIPTION

The embodiments or implementations disclosed in the above drawings and the following detailed description are not intended to be exhaustive or to limit the present disclosure to these embodiments or implementations.

Figure 1:
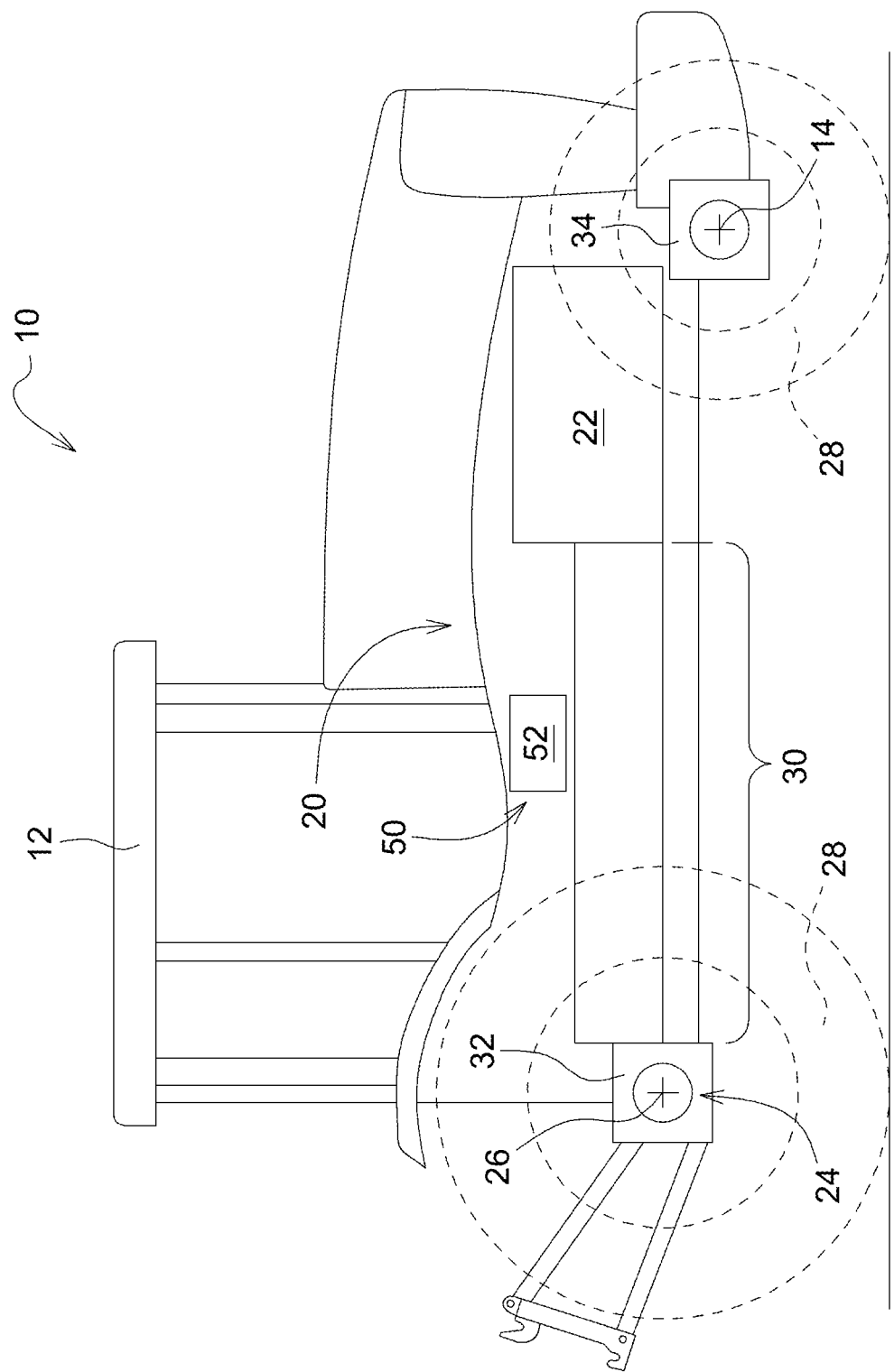
FIG. 1 shows a schematic illustration of an agricultural towing vehicle according to the disclosure.

FIG. 1 shows a schematic illustration of an agricultural towing vehicle 10 according to the disclosure, in particular in the form of a tractor, with a drivetrain 20 in one possible configuration. The basic structure of an agricultural towing vehicle 10 is assumed to be known to a person skilled in the art. The towing vehicle 10 also comprises a cab 12, a front vehicle axle 14, and a rear vehicle axle 26. The front vehicle axle 14 and the rear vehicle axle 26 are part of the drivetrain 20, with it being possible for the rear vehicle axle 26 generally to be permanently driven and the front vehicle axle 14 generally to be activated on demand.

The drivetrain 20 also comprises a drive motor 22, which may be in the form of an internal combustion engine, and a transmission structure, which may be composed of various individual transmission components. Starting from the drive motor 22, the transmission structure may have a transmission arrangement 30, a travel drive 24, a rear axle drive 32 and a front axle drive 34 in the power and torque flow. With the transmission arrangement 30, driving power of the drive motor 22 can be transmitted, in particular with different transmission stages, to the rear vehicle axle 26 and, if necessary, additionally to the front vehicle axle 14. The rear vehicle axle 26, which converts rotation of the front and/or the rear vehicle axle (via ground engagement means connected thereto) into propulsion of the tractor 10, is therefore driven at a different rotational speed depending on a transmission stage selected in the transmission arrangement 30. The towing vehicle 10 may have one or more ground engagement means in the form of wheels 28, which engage with an underlying surface to transmit drive forces and/or by way of which the towing vehicle 10 is supported on the underlying surface. The towing vehicle 10 may moreover have a chassis, it being possible for the chassis in particular to be borne by the wheels suspended on the front and the rear vehicle axle 14, 26.

In addition, a device 50 according to the disclosure with a control unit 52 for carrying out the method according to the disclosure is contained in the towing vehicle 10.

Figure 2:
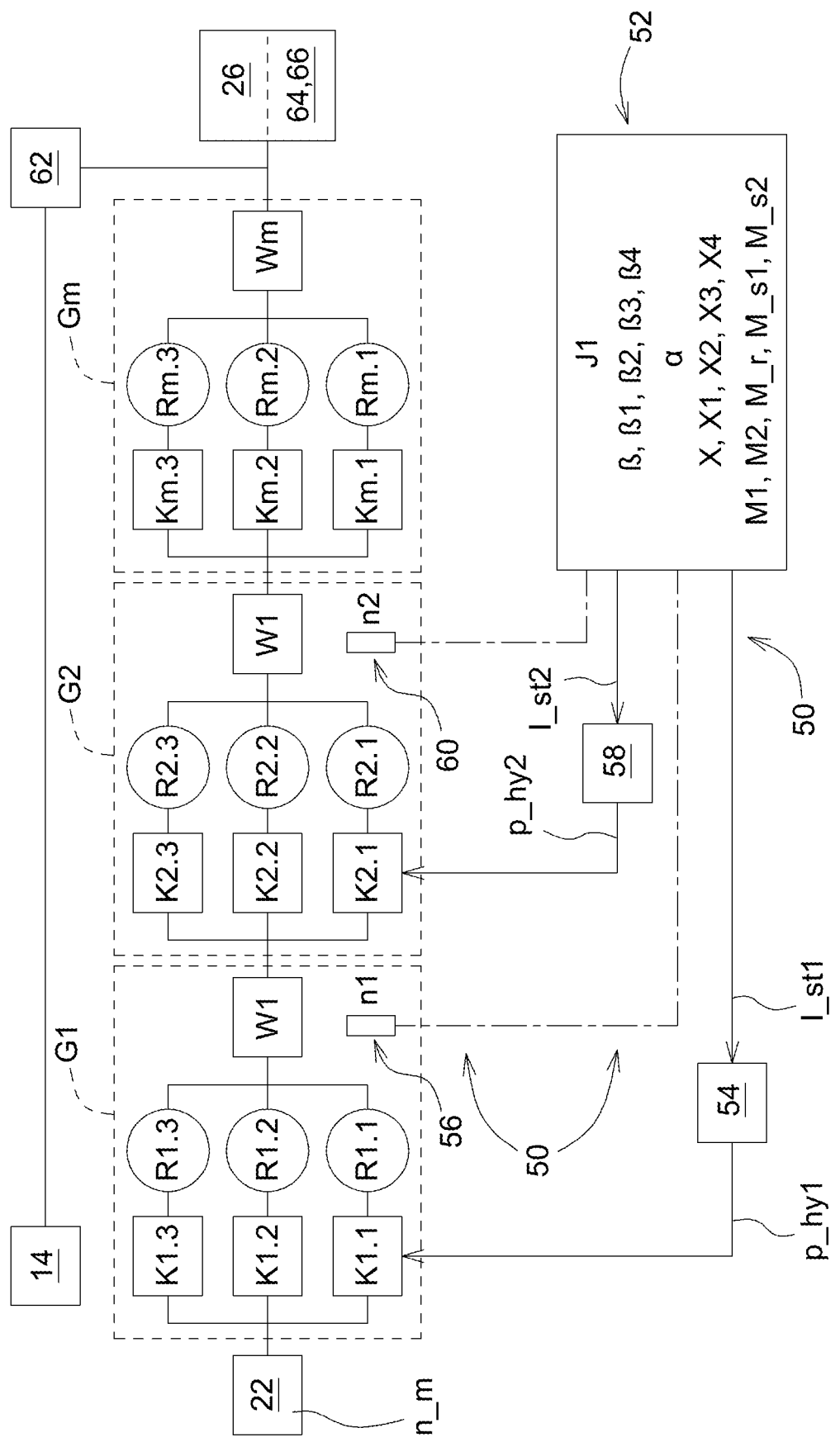
FIG. 2 shows a schematic illustration in the manner of a block diagram of individual components of the agricultural towing vehicle and of a first exemplary embodiment of the device according to the disclosure for carrying out the method according to the disclosure.

FIG. 2 shows a schematic illustration in the manner of a block diagram of an exemplary embodiment of the device 50 and individual components of the towing vehicle 10. The transmission arrangement 30 has a number 1 to m of transmission stages G, wherein in the present example m=3, consequently there are three transmission stages G1, G2, G3.

The drive motor 22 can be connected or is connected in terms of drive to the first transmission stage G1 on the output side. The first transmission stage G1 contains, by way of example, three clutches K1.1, K1.2, K1.3, each of which is connected in terms of drive to an output shaft W1 by means of a specific transmission ratio R1.1, R1.2, R1.3. The transmission ratios R1.1, R1.2, R1.3 are for example designed as gear sets or gear stages. The clutches K1.1, K1.2, K1.3 are connected or can be connected in terms of drive on the drive side to the drive motor 22. On the output side, the clutches K1.1, K1.2, K1.3 are connected in terms of drive to the output shaft W1. The clutches K1.1, K1.2, K1.3 are respectively activatable via a hydraulic valve between a closed state (with complete power transmission) and an open state (with interrupted power transmission). This activation is shown by way of example using a hydraulic valve 54 for the clutch K1.1. The valve 54 can be actuated and/or can be set by means of the control unit 52. In this case, the control unit 52 defines the values of an electrical control current $I\_st\_1.1$ for the hydraulic valve 54, or sets these values and/or processes these values. The clutch K1.1 can then be activated by means of the control current $I\_st\_1.1$ or by means of a hydraulic output pressure $p\_hy1$ of the valve 54.

A physical variable representing the rotation of the output shaft W1, e.g. its rotational speed n1, is detected or determined by means of a rotational speed sensor 56. For example, an angular acceleration $\alpha$ of the output shaft W1 can be derived from this. The rotational speed sensor 56, like the hydraulic valve 54 and other valves for activating the other clutches K1.2, K1.3 in the transmission stage G1, is for example part of the device 50.

The above-described construction of the transmission stage G1 can also apply analogously to the transmission stage G2 and other transmission stages Gm. For example, in the transmission stage G2, the clutches K2.1, K2.2, K2.3 thereof are activatable by in each case one hydraulic valve 58. Here, a physical variable bringing about the clutch activation is a control current $I\_st\_2.1$ defined or set by the control unit 52 or a hydraulic output pressure $p\_hy2$ of the valve 58. The clutch units in the form of the clutches K2.1, K2.2, K3.3 are arranged following downstream or mounted downstream in the power flow of the drivetrain 20 of the output shaft W1. The clutches K2.1, K2.2, K3.3 are connected in terms of drive on the drive side to the output shaft W1 and are connected in terms of drive on the output side to an output shaft W2 in each case by means of a specific transmission ratio R2.1, R2.2, R2.3. The transmission ratios R2.1, R2.2, R2.3 are for example designed in turn as gear sets or gear stages. A physical variable representing the rotation of the output shaft W2, e.g. its rotational speed n2, is determined in turn by means of a rotational speed sensor 60. The rotational speed sensor 60, like the hydraulic valve 58 and other valves for activating the other clutches K2.2, K2.3 in the transmission stage G2, is for example part of the device 50.

For example, the same applies to the construction of the transmission stage Gm with the clutch units in the form of the clutches K3.1, K3.2, K3.3 and the transmission ratios R3.1, R3.2, R3.3 to an output shaft Wm. The output shaft Wm is connected in terms of drive in the power flow of the drivetrain 20 to the rear vehicle axle 26 and, if necessary—in the case of a closed all-wheel clutch 62—also to the front vehicle axle 14. By means of an activatable parking lock 64 and/or a braking device 66 of the towing vehicle 10, the output shaft Wm and components mounted upstream in the power flow in the transmission arrangement 30 or in the two transmission stages G1, G2 can be blocked. For example, a torque on the output side of the clutch K2.1 can thereby be equal to zero.

As already mentioned, the number of clutches K shown in the transmission arrangement 30 should be considered merely as being by way of example. Individual transmission stages G may also contain a number other than three clutches K, and the number of clutches K in the individual transmission stages G may differ from one another.

Figure 3:
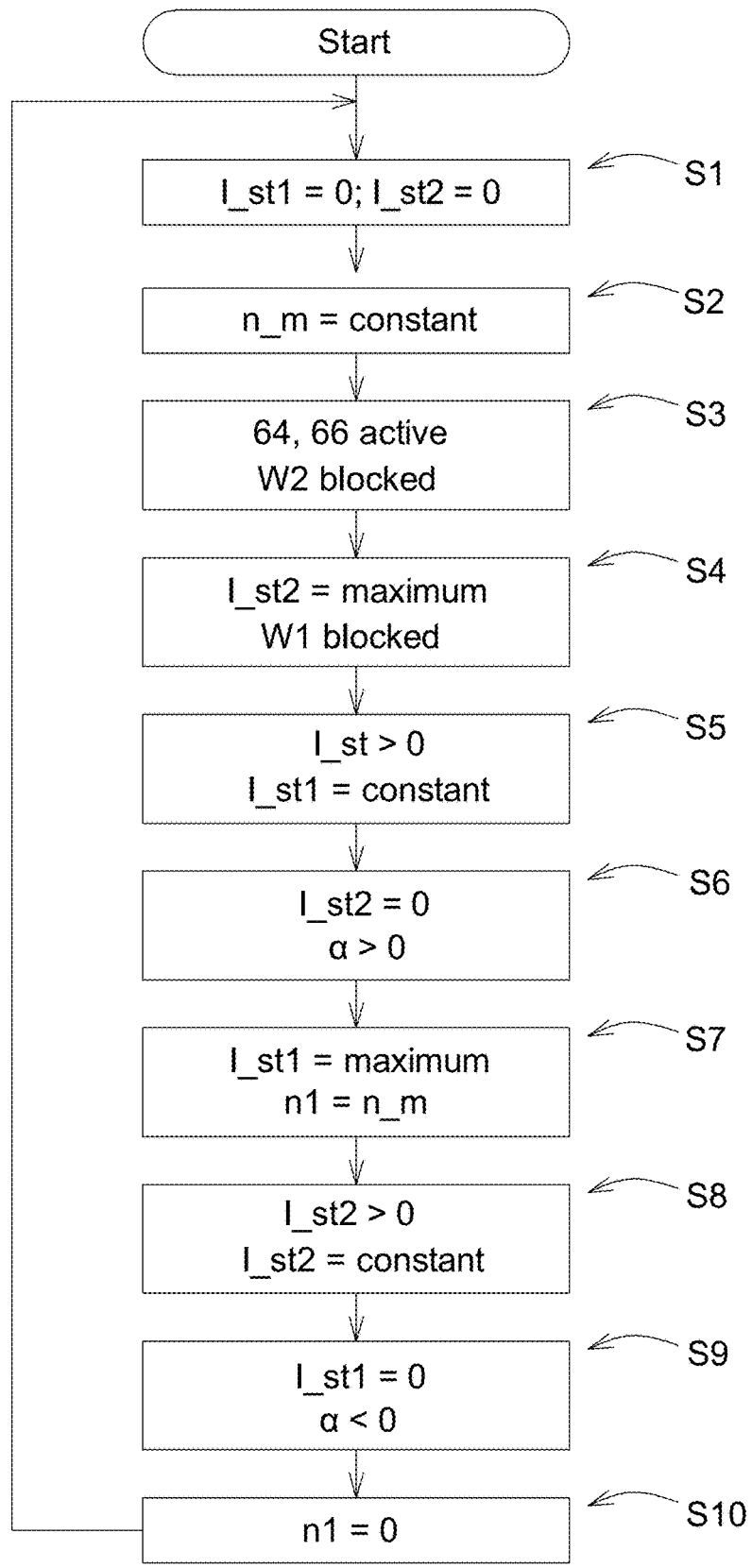
FIG. 3 shows a flow diagram with method steps for carrying out the method according to the disclosure.

FIG. 3 shows a flow diagram with individual steps for carrying out the method for calibrating a selected clutch K within the drivetrain 20 or within the transmission arrangement 30. By way of example, the clutch K1.1 is selected and method steps for its calibration are explained below.

In a method step S1, the output shaft W1 mounted downstream of the selected clutch K1.1 is separated from all drive connections mounted upstream and downstream by the selected clutch K1.1 (and optionally also the clutches K1.2, K1.3) and the clutch K2.1 (and optionally also the clutches K2.2, K2.3) being in its/their open state ($I\_st\_1.1=0$, $I\_st\_2.1=0$). In a method step S2, the drive motor 22 runs at a constant rotational speed $n\_m$. In a method step S3, the parking lock 64 and/or the braking device 66 are activated and all the clutches Km·1, Km·2, Km·3 mounted downstream of the output shaft W2 are in their closed state. This blocks the output shaft W2.

In a further method step S4, the output shaft W1 is also blocked by the clutch K2.1 being activated with the maximum electrical control current $I\_st\_2.1$ and consequently being in its closed state. Alternatively, the method steps S1, S2, S3, S4 may also be arranged in a different step sequence.

The control current $I\_st\_1.1$ for the selected clutch K1.1 is subsequently set to a value greater than zero, which is kept constant for a defined period of time (method step S5). In this state, the output shaft W1 is connected in terms of drive to the running drive motor 22 via the selected clutch K1.1.

If the control current $I\_st\_1.1$ remains constant, the output shaft W1 is separated from the drive connections following downstream or mounted downstream in the power flow. This separation is undertaken by the clutch K2.1, the control current $I\_st\_2.1$ of which is set to zero, which causes the clutch K2.1 to be transferred into its open state (method step S6). This leads to an acceleration of the output shaft W1 with an angular acceleration $\alpha>0$.

The control current $I\_st\_1.1$ continues to be kept constant so that the rotational speed n1 of the output shaft W1 increases and in particular can reach the motor rotational speed $n\_m$ of the drive motor 22. In a subsequent method step S7, the clutch K1.1 is activated with the maximum control current $I\_st\_1.1$ and thereby transferred into its closed state. The output shaft W1 rotates at the motor rotational speed $n\_m$ of the drive motor 22. The clutch K2.1 is then activated with a defined or set control current $I\_st\_2.1>0$ (method step S8), with a torque on the output side of said clutch K2.1 being equal to zero because of the blocked output shaft W2 mounted downstream.

After this method step S8, the control current $I\_st\_1.1$ of the clutch K1.1 is set to $I\_st\_1.1=0$, as a result of which the clutch K1.1 is transferred into its open state (method step S9). This leads to a deceleration of the output shaft W1 with an angular acceleration $\alpha<0$. The defined or set control current $I\_st\_2.1$ of the clutch 2.1 is kept constant until the output shaft W1 reaches the rotational speed $n1=0$ (method step S10).

With the described method steps S1 to S10, the selected clutch K1.1 and the clutch unit or clutch K2.1 mounted downstream of the output shaft in the power flow are activated in a specific manner and temporally successively for specific periods of time in order to realize suitable acceleration and deceleration sequences at the output shaft W1.

After the method step S10, the sequence can be started again in order to define or set other values of the control current $I\_st\_1.1$ and/or of the control current $I\_st\_2.1$ in the method steps S5 and/or S8.

The following variables are particularly relevant for generating calibration data β for the selected clutch K1.1:
- the defined or set control currents I_st_1.1, I_st_2.1,
- the rotational speeds n1, detected by means of the rotational speed sensor 56, of the output shaft W1 and the angular acceleration α, determined therefrom, of the output shaft W1,
- the moment of inertia J1, known through calculation, of the output shaft W1,
- the set rotational speed n_m of the drive motor 22,
- the transmission ratio R1.1.

These variables or their values are assigned to one another in order to generate the calibration data β depending on this assignment.

The following equations apply for the calibration data β=(β1, β2, β3, β4) for the selected clutch K1.1

$$X1 = n1^2, \quad (eq.\ 2)$$

$$X2 = (n1 - (n\_m \cdot R1.1))^2, \quad (eq.\ 3)$$

$$X3 = I\_st\_1.1, \quad (eq.\ 4)$$

$$X4 = I\_st\_2.1. \quad (eq.\ 5)$$

Based on the equations eq. 2 to eq. 5, equation eq. 1 is calculated. This results in the result vector β. In this case:

$$\beta1 = f1/J1, \quad (eq.\ 6)$$

$$\beta2 = f2/J1, \quad (eq.\ 7)$$

$$\beta3 = M1/J1, \quad (eq.\ 8)$$

$$\beta4 = M2/J1. \quad (eq.\ 9)$$

The components β1, β2 can be considered to be physical correction variables.

The component β1 contains a factor f1, which comprises the sum of the drag torque M_s2 to the clutches K2.1 to K2.3 and the friction torque M_r, i.e. f1=−(M_s2−M_r).

The component β2 contains a factor f2=−M_s1, which comprises the drag torque M_s1 to the clutches K1.1 to K1.3.

The torque M1 results from β3. J1 for the clutch K1.1 at a control current I_st_1.1 defined or set by the control unit 52. The torque M2 results from β4. J1 for the clutch K2.1 at a control current I_st_2.1 defined or set by the control unit 52.

The above-mentioned method steps for calibrating a selected clutch, e.g. the clutch K1.1, can be repeated for differently defined values of the control currents I_st_1.1, I_st_2.1 such that a torque M1 of the clutch K1.1 for different control currents I_st_1.1 is contained in the calibration data β, in particular in the component β3. In other words, the calibration data β, in particular the component β3, represent a torque characteristic of the clutch K1.1. This torque characteristic can be provided as a complete characteristic curve by means of the calibration data β, in particular the component β3.

The calibration data β can be generated in principle for any clutches K1.1 to Km-3 within the drivetrain 20 or the transmission arrangement 30.

In the practical application of the generated and provided calibration data β, for example, the clutch K1.1 is activated by means of the control current I_st_1.1 in the direction of the open state up to a "beginning slip of the clutch" state. Depending on the value of the control current I_st_1.1 in this state, the calibration data β, in particular β3, provided at the clutch K1.1 can be used to determine the torque M1, and in particular friction torques and drag torques, in accordance with β1 and β2, by means of which, in turn, a torque acting at a certain position of the drivetrain 20 can be ascertained. Depending on the value of the control current I_st_2.1 in this state, the calibration data β, in particular β4, provided at the clutch K2.1 can be used to determine the torque M2, in particular taking into consideration friction torques and drag torques in accordance with β1 and β2.

This allows the calibration data β provided to assist, for example, a drive management (e.g. traction aid) for the towing vehicle 10.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the drawings, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A method for calibrating a selected clutch which, arranged within a drivetrain of an agricultural towing vehicle, is activatable between a closed and an open state, the method comprising:
connecting the selected clutch in terms of drive on the drive side to a running drive motor of the agricultural towing vehicle and connecting in terms of drive on the output side to an output shaft;
defining the value of a first physical variable bringing about the clutch activation; determining a second physical variable representing the rotation of the output shaft; and
assigning the second physical variable representing the rotation of the output shaft to the value of the first physical variable bringing about the clutch activation, in order to generate calibration data of the selected clutch depending on the assignment;
wherein the determining step includes at least one of the following steps:
separating the output shaft from all drive connections mounted upstream and downstream in the power flow of the drivetrain;
accelerating the output shaft by being connected in terms of drive to the drive motor and being separated from the drive connections mounted downstream in the power flow of the drivetrain;
rotating the output shaft at a constant rotational speed; and
decelerating the output shaft by activating a clutch unit following downstream in the power flow of the drivetrain with a defined value of a physical variable bringing about the clutch activation thereof, wherein an output-side torque of the clutch unit is equal to zero.

2. The method of claim 1, wherein the method is carried out successively for differently defined values of the first physical variable bringing about the clutch activation.

3. The method of claim 1, wherein the first physical variable activating the clutch is an electrical control current of a hydraulic valve activating the clutch.

4. The method of claim 1, wherein the second physical variable representing the rotation of the output shaft is one of the following variables: a rotational speed of the output shaft, an angular speed of the output shaft, and an angular acceleration of the output shaft.

5. The method of claim 4, wherein the angular acceleration of the output shaft has an acceleration phase brought about by the activation of the selected clutch and has a deceleration phase which is at least temporarily brought about by the activation of a clutch unit following downstream in the power flow of the drivetrain.

6. The method of claim 1, wherein a moment of inertia of the output shaft is contained in the calibration data.

7. The method of claim 1, wherein the calibration data include at least one physical correction variable including a drag torque of the selected clutch, a drag torque of a clutch unit following downstream of the output shaft in the power flow of the drivetrain, and a friction torque of the output shaft.

8. The method of claim 1, wherein, during the deceleration of the output shaft, the selected clutch is in its open state and at least one of a parking lock and a braking device of the towing vehicle is activated.

9. The method of claim 1, wherein the motor rotational speed of the drive motor is kept constant while calibrating the selected clutch.

10. A device for calibrating a selected clutch which, arranged within a drivetrain of an agricultural towing vehicle, is activatable between a closed and an open state, comprising:
a hydraulic valve for activating the selected clutch between a closed and an open state;
a rotational speed sensor for detecting a rotational speed of an output shaft, which is connected in terms of drive to the selected clutch on the output side thereof; and
a control unit configured to:
connect the selected clutch in terms of drive on the drive side to a running drive motor of the agricultural towing vehicle and is connected in terms of drive on the output side to an output shaft;
define the value of a physical variable bringing about the clutch activation;
determine a physical variable representing the rotation of the output shaft;
assign the physical variable representing the rotation of the output shaft to the value of the physical variable bringing about the clutch activation, in order to generate calibration data of the selected clutch depending on the assignment;
wherein the determining step includes at least one of the following steps:
separating the output shaft from all drive connections mounted upstream and downstream in the power flow of the drivetrain;
accelerating the output shaft by being connected in terms of drive to the drive motor and being separated from the drive connections mounted downstream in the power flow of the drivetrain;
rotating the output shaft at a constant rotational speed; and
decelerate the output shaft by activating a clutch unit following downstream in the power flow of the drivetrain with a defined value of a physical variable bringing about the clutch activation thereof, wherein an output-side torque of the clutch unit is equal to zero.

11. The device of claim 10, wherein the control unit is configured to repeat the calibration for differently defined values of the first physical variable bringing about the clutch activation.

12. The device of claim 10, wherein the first physical variable activating the clutch is an electrical control current of a hydraulic valve activating the clutch.

13. The device of claim 10, wherein the second physical variable representing the rotation of the output shaft is one of the following variables: a rotational speed of the output shaft, an angular speed of the output shaft, and an angular acceleration of the output shaft.

14. The device of claim 13, wherein the angular acceleration of the output shaft has an acceleration phase brought about by the activation of the selected clutch and has a deceleration phase which is at least temporarily brought about by the activation of a clutch unit following downstream in the power flow of the drivetrain.

15. The device of claim 10, wherein a moment of inertia of the output shaft is contained in the calibration data.

16. The device of claim 10, wherein the calibration data include at least one physical correction variable including a drag torque of the selected clutch, a drag torque of a clutch unit following downstream of the output shaft in the power flow of the drivetrain, and a friction torque of the output shaft.

17. The device of claim 10, wherein, during the deceleration of the output shaft, the selected clutch is in its open state and at least one of a parking lock or a braking device of the towing vehicle is activated.

18. The device of claim 10, wherein the motor rotational speed of the drive motor is kept constant while calibrating the selected clutch.

* * * * *